(12) United States Patent
Bolza-Schünemann

(10) Patent No.: US 7,017,483 B2
(45) Date of Patent: Mar. 28, 2006

(54) METHOD AND DEVICE FOR REDUCING VIBRATIONS IN ROTATING COMPONENTS

(75) Inventor: Claus August Bolza-Schünemann, Würzburg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 58 days.

(21) Appl. No.: 10/500,466

(22) PCT Filed: Oct. 19, 2002

(86) PCT No.: PCT/DE02/03958

§ 371 (c)(1),
(2), (4) Date: Jul. 15, 2004

(87) PCT Pub. No.: WO03/064763

PCT Pub. Date: Aug. 7, 2003

(65) Prior Publication Data

US 2005/0081728 A1    Apr. 21, 2005

(30) Foreign Application Priority Data

Feb. 1, 2002   (DE) ............... 102 04 322
Jul. 2, 2002    (DE) ............... 102 29 708

(51) Int. Cl.
 *B41F 5/00*   (2006.01)
 *B41F 13/02*  (2006.01)
 *D21F 11/00*  (2006.01)
 *F16F 15/10*  (2006.01)

(52) U.S. Cl. ............ 101/216; 101/219; 162/198; 74/574

(58) Field of Classification Search ........... 101/216, 101/219, 484, 212; 162/198, 252, 361; 74/574, 74/572; 100/170, 160, 219, 47, 85, 162 B
See application file for complete search history.

(56) References Cited

U.S. PATENT DOCUMENTS

| | | | |
|---|---|---|---|
| 3,347,157 A | 10/1967 | Kemp | 100/41 |
| 4,905,598 A | 3/1990 | Thomas et al. | 101/219 |
| 4,936,207 A | 6/1990 | Niskanen et al. | 100/47 |
| 5,022,319 A * | 6/1991 | Biondetti | 100/170 |
| 5,201,586 A * | 4/1993 | Zimmermann et al. | 384/247 |
| 5,226,357 A * | 7/1993 | Schiel | 100/47 |
| 5,596,931 A * | 1/1997 | Rossler et al. | 101/484 |
| 5,703,574 A * | 12/1997 | Allonen | 340/870.07 |
| 5,915,297 A * | 6/1999 | Lehtovirta et al. | 100/336 |
| 5,917,315 A * | 6/1999 | Weckstrom | 324/76.23 |
| 5,961,899 A | 10/1999 | Rossetti et al. | 264/40.1 |
| 6,085,723 A | 7/2000 | Pels et al. | 123/339.22 |
| 6,138,629 A | 10/2000 | Masberg et al. | 123/192.1 |
| 6,156,158 A | 12/2000 | Kustermann | 162/198 |
| 6,257,133 B1 * | 7/2001 | Anderson | 100/162 B |
| 6,309,333 B1 * | 10/2001 | Kirchner | 492/16 |

(Continued)

FOREIGN PATENT DOCUMENTS

DE    196 52 769 A1    6/1995

(Continued)

*Primary Examiner*—Andrew H. Hirshfeld
*Assistant Examiner*—Wasseem H. Hamdan

(57) ABSTRACT

Undesirable bending vibrations in at least one rotating component are reduced. An undesirable vibration is counteracted by the use of at least one actuator. A required sequence of signals to be applied to the actuator and/or an intensity level of those signals is based on an angle of rotation position of the rotating component. The rotating component is then subjected to a force based on the position of the angle of rotation.

33 Claims, 3 Drawing Sheets

U.S. PATENT DOCUMENTS

| | | |
|---|---|---|
| 6,387,214 B1 | 5/2002 | Kustermann et al. ........ 162/198 |
| 6,419,794 B1 * | 7/2002 | Kustermann ................. 162/252 |
| 2003/0010150 A1 | 1/2003 | Glockner et al. ............ 464/180 |

FOREIGN PATENT DOCUMENTS

| | | |
|---|---|---|
| DE | 197 09 134 A1 | 9/1998 |
| DE | 199-30 600 A1 | 2/2000 |
| DE | 100 22 151 A1 | 11/2001 |
| EP | 0 319 886 | 6/1989 |
| EP | 0 331 870 | 9/1989 |
| EP | 0 419 826 A1 | 4/1991 |
| EP | 0 956 950 A1 | 5/1998 |
| JP | 04236819 A | 1/1991 |
| JP | 11-58677 | 3/1999 |
| JP | 11-170474 | 6/1999 |
| WO | WO 98/03832 | 7/1996 |
| WO | WO 01/50035 A1 | 12/2000 |

* cited by examiner

METHOD AND DEVICE FOR REDUCING VIBRATIONS IN ROTATING COMPONENTS

CROSS-REFERENCE TO RELATED APPLICATIONS

This application is the US National Phase, under 35 USC 371 of PCT/DE 02/03958 filed Oct. 19, 2002; published as WO 03/06 4763 on Aug. 7, 2003 and claiming priority to DE 102 04 322.1, filed Feb. 1, 2002 and to DE 102 29 7088.8 filed Jul. 2, 2002.

FIELD OF THE INVENTION

The present invention is directed to a method and to a device for reducing vibrations in rotating components. An actuator is used to counteract the bending of the rotating component.

BACKGROUND OF THE INVENTION

A method and a device for the active suppression of vibrations is known from EP 0 956 950 A1. Compensating forces are applied to rollers, for example, as a function of measured forces. The frequency for applying the compensating force is continuously determined, inter alia from the actual rpm and from the phase and amplitude of the measurements from the path signals of a spacing sensor.

EP 0 331 870 A2 discloses an arrangement for the seating of cylinders. Journals of a cylinder are seated in two bearings that are arranged side-by-side in the axial direction of the cylinder. The bearings can be individually moved vertically with respect to the cylinder axis of rotation by the use of pressure medium cylinders, for example, for compensating for bending.

A method for compensating for vibrations of rotating components is disclosed in WO 01/50035 A1. An actuator is arranged in the area of a surface of the rotating components and, in the course of activation of the actuator, as a function of the angle of rotation position of the rotating components, this actuator counteracts the vibration by use of a force component in the axial direction of the rotating component.

JP 4-236819 A describes a system for reducing bending vibrations in a shaft. A rotating disk that is connected with the shaft, is charged with forces by the use of piezo elements via electromagnets as a function of measured values.

In its discussion of the prior art, WO 97/03832 A1 sets forth various ways by which bending or bending vibrations in impression cylinders can be statically reduced. As a dynamic solution this document proposes to measure occurring vibrations and to use these measured values for regulating and controlling actuators.

DE 199 30 600 A1 discloses a method for the reduction of undesirable bending vibrations in a rotating component of a coating device by the use of an actuator. The actuator acts on a bearing journal.

SUMMARY OF THE INVENTION

The object of the present invention is directed to providing a method and a device for reducing vibrations in rotating components.

In accordance with the present invention, this object is attained by the provision of at least one actuator in the rotating component. The actuator can be charged with signals so that it will exert forces to counteract the bending of the rotating components, which bending causes the vibrations. A sequence of signals or their strength is predicted as a function of the angle of rotation position of the component. The at least one actuator is charged with these signals based on the angle of rotation position of the component. A course of the vibrations is determined as a function of the rotational position. This course is counteracted by use of the predicted sequence of signals or their strengths. The rotating components is typically seated in bearings by its journals. A shape of an axial bending line of at least one journal can be changed by the actuator.

The advantages to be gained by the present invention lie, in particular, in that a possibility for effectively reducing vibration is providing with little outlay of time, labor and capital. The reduction of the vibrations can take place actively during a production run.

The correlation of countermeasures to be taken, with the angle of rotation position of the rotating component, is of particular advantage. Many of the periodically repeated obstructions, such as, for example, asymmetries, surface errors, grooves and other interruptions of the surface, balance errors, can be addressed, for example.

The method for reducing vibrations in rotating components in accordance with the present invention makes it possible to counteract an excitation, or vibration in the rotating component, at the moment it arises, without a negative effect having been initially detected and processed, before a suitable step is taken. The course of the step relating to the angle of rotation, as well as its size, is predicted in a preferred embodiment.

The continuous measurement and further processing of data regarding vibrations or deformations can be omitted.

Particularly in a case where two or more cylinders are working together, such as, for example, for so-called "rubber-against-rubber printing" in printing units, and where one or several of the cylinders have obstructions on their surfaces or have balance errors, the method of the present invention counteracts the generation of vibrations and thus aids in the prevention of so-called "bumping up" of the entire system.

BRIEF DESCRIPTION OF THE DRAWINGS

Preferred embodiments of the present invention are represented in the drawings and will be described in greater detail in what follows. Shown are in.

DESCRIPTION OF THE PREFERRED EMBODIMENTS

Figure 1:
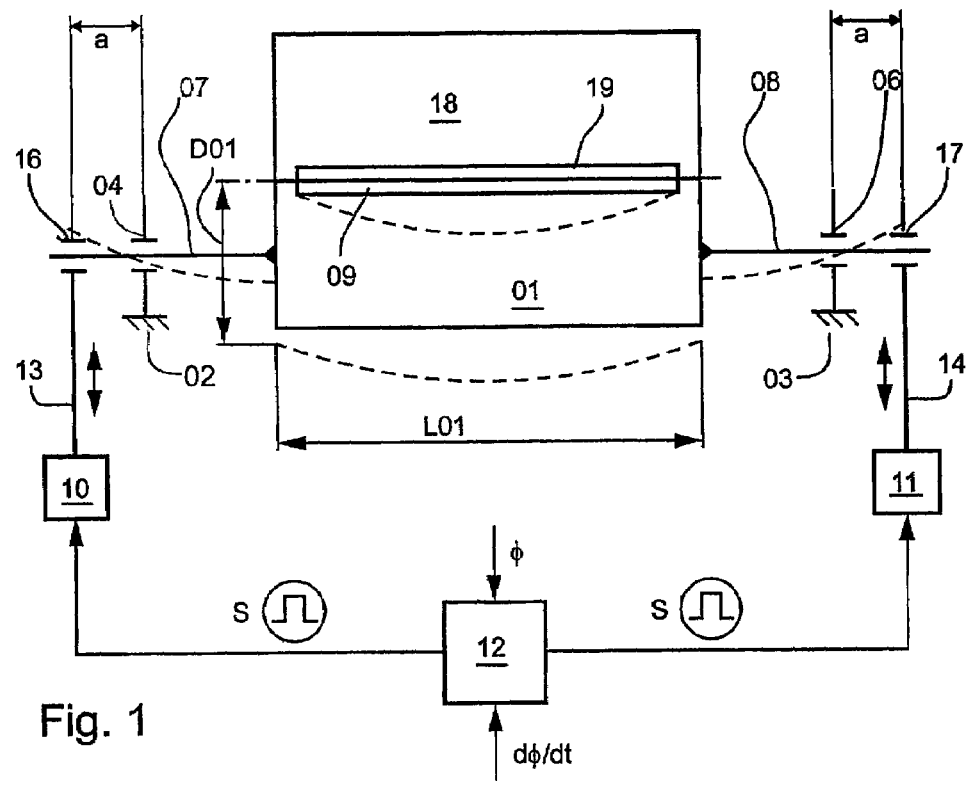
FIG. 1, a first preferred embodiment of a method and a device for reducing vibrations in accordance with the present invention.

A rotating component 01, for example a cylinder 01 or a roller 01 of a processing machine, in particular of a rotary printing press, for example for web-shaped goods, is rotatably seated between two lateral frames 02, 03, as depicted specifically in FIG. 1. For this purpose, the cylinder 01 has journals 07, 08, for example at the ends, which journals 07, 08 are seated in bearings 04, 06. The cylinder 01 has a length of from 1350 to 1550 mm, for example, and a diameter of from 450 to 700 mm, in particular from 500 to 600 mm, for example. The cylinder 01 has a ratio between a cylinder length L01 and a cylinder diameter D01 of 6 to 12, and in particular between 7 and 11, for example.

Undesirable vibrations of the cylinder 01, in particular undesirable bending vibrations, can occur during rotation, which bending vibrations can be caused, for example, by balance errors, by cylinder asymmetry, or by rolling off on another rotating component, which is possibly also asymmetrical. For example, one or more grooves 09, extending axially on the surface of cylinder 01 and usable for fastening non-represented dressings, or joints at the ends of dressings, constitute periodically occurring obstructions 09, which excite the undesirable bending vibrations in the cylinder 01. It is common to the obstructions 09 that they occur in an identical, or at least in similar size and order of magnitude in connection with a known stationary operating situation. A snapshot of the cylinder 01, for example at the reversing point of the vibration, is represented in dashed lines, in a greatly exaggerated manner, in FIG. 1.

At least one actuator 10, 11, by use of which the vibrations can be counteracted, is assigned to the cylinder 01 for the purpose of reducing the undesirable vibrations. For this purpose, the actuator 10, 11 is charged with signals S, whose sequence and/or whose strength is predicted as a function of an angle of rotation position $\Phi$ of the rotating component. The angle of rotation position $\Phi$ of the cylinder 01 is known, for example, either from a machine control device, which is not specifically represented, or from an angle-regulated electric motor, which is also not specifically represented, which electric motor drives the cylinder 01, or is determined by the use of a sensor at the cylinder 01.

Figure 2:
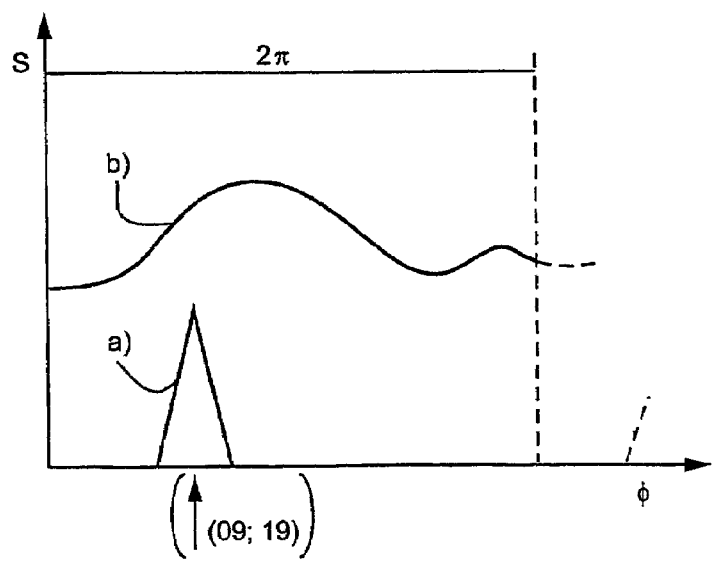
in FIG. 2, depictions of the dependency of a signal for an actuator from an angle of rotation position of a cylinder (a: discrete, b: continuous)

FIG. 2 shows representations, by way of example, of the course and strength of the signals S, which are, for example, stored or predicted in a control or memory device 12, or in a circuit, as a function of the angle of rotation position. For example, in case of the presence of one cylinder obstruction 09, the period length represented, which is periodically repeated, can be one revolution, for example $2\pi$, or 360° or, in case of several, symmetrically arranged comparable obstructions 09, the period length can be a whole number portion of a revolution, for example 180°, 120°, etc. In the course of a steady state or stationary operating situation, the actuator 10, 11 is charged, during periodic repetitions, with the predicted sequence, or strength, of the signal S. The dependency S ($\Phi$) can be stored in the form of discrete pulses (a), or as a function (b) which continuously extends within a period. If charging takes place by a changeable force, it is advantageous that at least one journal 07, 08 of the rotating component 01, 18 is specifically charged with an appropriate force pulse at least one per revolution. The signal S is directly correlated with the angle of rotation position $\Phi$. Different dependencies can be stored for different operating situations, such as, for example, for different rpm ranges, for different dressings or for other values determining the characteristics of the bending. It is thus possible, for example in the vicinity of rpm of the resonance frequency of the excitation of the cylinder 01, to demand higher levels than in other areas. These dependencies can also be mathematically connected with each other, or can each be generated in a different way. Thus, for approximately the same cylinder configurations, the course can be identical, but the absolute strength can be correlated with the existing angular speed $d\Phi/dt$ in the form of an offset or a spread.

In the preferred embodiment in accordance with FIG. 1, one actuator 10, 11 acts on one of the journals 07, 08 respectively, in that a coupler 13, 14 encloses the journal 07, 08 respectively via a bearing 16, 17, for example. In an advantageous embodiment, each coupler 13, 14 acts on a portion of the respective journal 07, 08 which protrudes past the respective bearing 04, 06 and acts on the side of the journal 07, 08 which faces away from the cylinder 01. The course of the cylinder 01 and the journals 07, 08, which is represented in dashed lines, is now counteracted by operation of the control device 12, in that the actuator 10, 11 applies a counterforce either positive or negatives to the journal 07, 08 at suitable angle of rotation positions $\Phi$ corresponding to signals S, or continuously, in case of a continuous course. The signal contains the size and, if required, the direction of the counterforce to be applied by the actuator. The bearings 04, 06 constitute a nip or a pivot point of the journals 07, 08. A bending moment is introduced into the cylinder 01 via a portion of each journal 07, 08 exterior of the bearing 04, 06 respectively and representing a lever arm. In principle, one actuator 10, 11 can be sufficient for the cylinder 01, but the arrangement of two actuators 10, 11, each in the area of a journal 04, 06, is advantageous.

Each actuator 10, 11 can be embodied as a piezo element 10, 11 in particular. Here, for example, the signal S controls the voltage from a voltage source, which is not specifically represented, which voltage is to be applied to the respective piezo element 10, 11. In place of the signal S, it is also possible to supply the actuator 10, 11 directly with an appropriate voltage which, in this case, has already been made available by the control device 12. However, other installations, for example units based on magnetic or hydraulic force, can also be considered as actuators 10, 11.

The journal or journals 07, 08 of the cylinder 01 is or are specifically charged with an external force or with a force pulse at least once per revolution of the cylinder 01, or undergo a change in the externally applied specific force at least once per revolution of the cylinder 01.

The cylinder 01, which may be, for example, in the form of a forme cylinder 01, acts together, for example, with a second rotating component 18, for example a second cylinder 18 such as, for example, a transfer cylinder 18, which cylinder 18 can also have one, or several similar axially extending obstructions 19 on its surface. However, it can also be configured without an obstruction 19. The triggering of the actuators 10, 11 now takes place, for example in the above mentioned manner, in such a way that the excitation of the vibration caused during the passage of the obstructions 09, 19, in particular, is also damped. It is possible, for example, to apply an appropriate pulse to the journal 07, 08 via the signal S simultaneously with the passage of the obstructions 09, 19. A great advantage of this operation is that the signal S, or the counterforce, is predicted, and therefore the counterforce, or an actuating path, can already be charged at the time of the excitation of a potential vibration. It is therefore not necessary to first measure a negative effect in order to then initiate a suitable reaction.

For engagement or disengagement, or for varying the engagement, for example, the cylinders 01, 18 are preferably seated so that they are variable, in distance, with respect to their axes of rotation, in all examples. For this purpose, at least one of the cylinders, for example the cylinder 01, is seated in the bearings 04, 06, which are, for example, embodied as eccentric bearings 04, 06. However, the at least one cylinder can also be pivotably seated on levers, or can be guided in a linear guide device.

Figure 3:
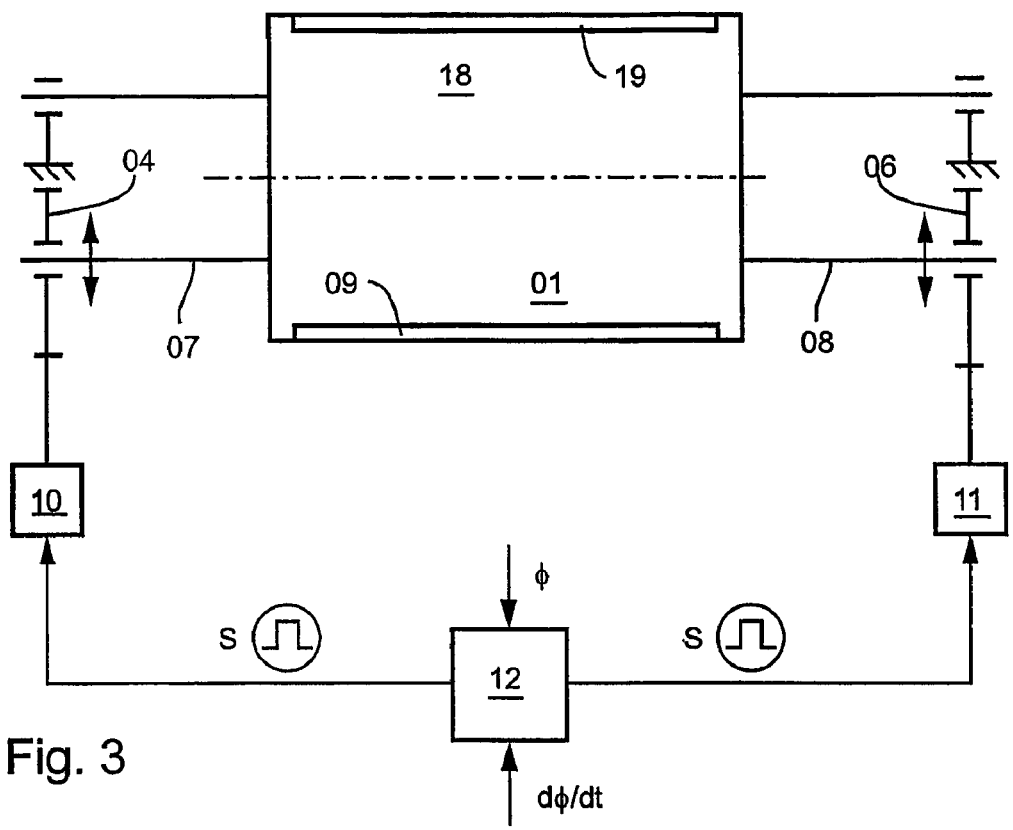
in FIG. 3, a second preferred embodiment of the method and the device in accordance with the present invention.

In a second preferred embodiment of the present invention, as depicted in FIG. 3, the cylinder 01 is movably supported. The actuator 10, 11 acts, for example, on the bearing 04, 06 itself, which bearing 04, 06 is embodied either to be movable in the lateral frame 02, 03, or is embodied as an eccentric bearing, for example as a three-ring bearing or as a four-ring bearing. By use of the actuator 10, 11, the cylinder 01 can be displaced in accordance with the signals S in its direction of movement, which direction extends substantially perpendicularly with respect to the axis of rotation of the cylinder 01. The movement of cylinder 01 has at least one component toward or away from a cylinder 18 acting together with it. The cylinder 01, for example as a forme cylinder 01, again works together, for example, with the second cylinder 18, which may have none, one or several obstructions 19 on its surface. Triggering of the actuators 10, 11 takes place in the manner already discussed in connection with the first preferred embodiment of the present invention. The signal S can contain information regarding the actuating path. In this way, it is possible to effectively reduce an excitation during the passage of an obstruction and/or to reduce a "post vibration" of the cylinder, depending on the stored course of the signal S.

Figure 4:
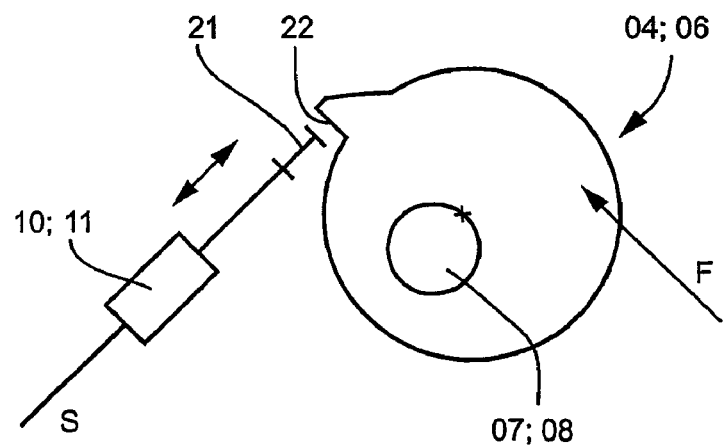
in FIG. 4, a variation of the second preferred embodiment; and in FIG. 5, preferred embodiments a), b) of the method and the device for use with a printing unit with four cylinders.

In a variation of the second preferred embodiment, as seen in FIG. 4, the actuators 10, 11 do not act directly on the cylinder 01, or its journal 07, 08, but instead act on a stop 21 which limits the print-on position of the cylinder 01 and which, depending on the status of the actuators 10, 11, permits the movement of the cylinder 01 within the limits of the actuating path predicted by the signal S. As a rule, in the print-on position of the cylinder 01, a counter-stop 22 is placed against the stop 21, for example by operation of a separate actuating device which is not specifically shown, and which twists the bearing 04, 06 with a force F. The force F may be received, for example, from a pressure medium cylinder, which is not specifically represented. Thus, for example, during the passage of the obstruction 09, 19, relief can be provided by extending the stop 21 opposite the counter-stop 22, and the excitation can be damped, or suppressed, in this way. Although the stop 21 is represented in connection with an eccentric bearing 04, 06 in the configuration depicted in FIG. 4, the method of operation can be applied in the same way to linear bearings, or to bearings supported in pivotable levers.

Figure 5:
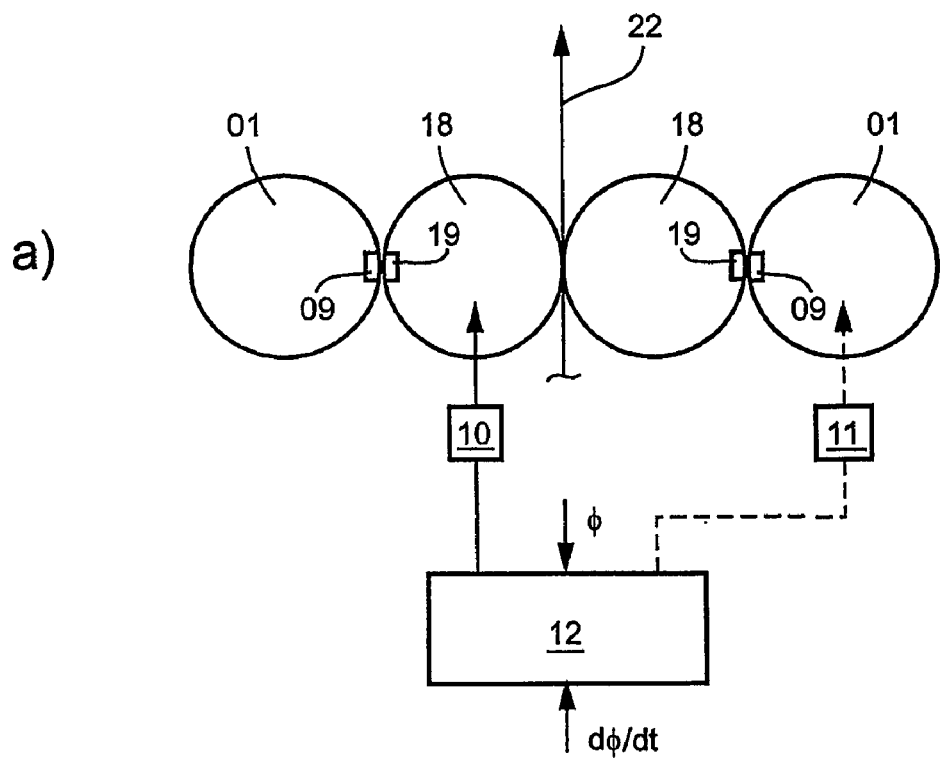
Figure 5:
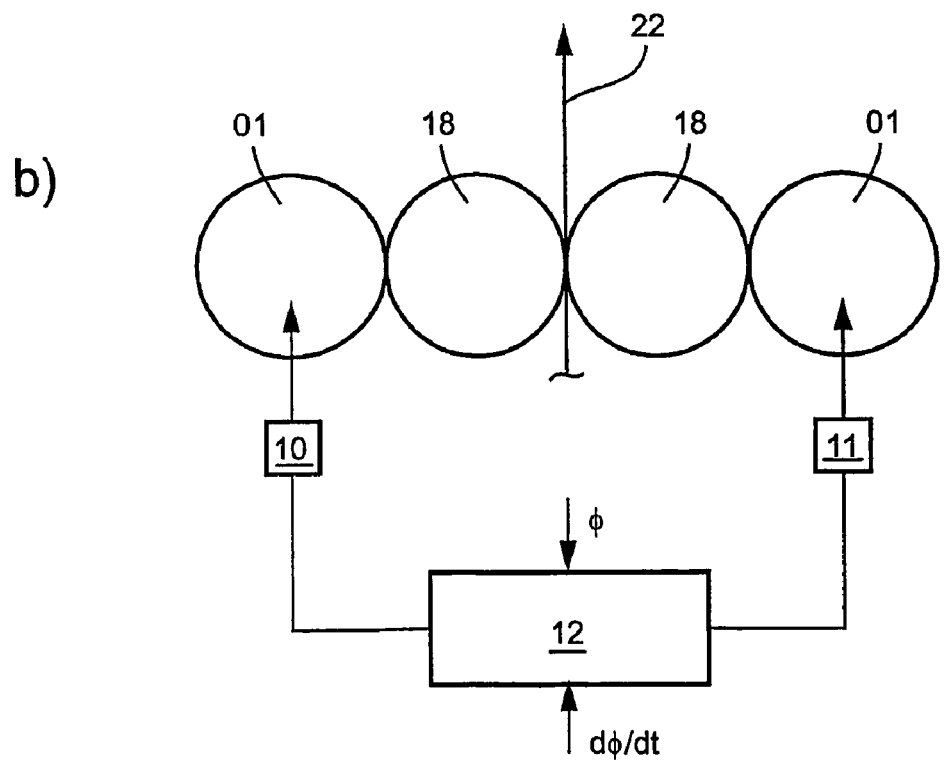

As represented in FIG. 5, the employment of the method of operation in accordance with the present invention is of great advantage in printing units in which two cylinder pairs, each comprised respectively of a forme cylinder 01 and of a transfer cylinder 18, constitute a double print position for a web 22 passing between the transfer cylinders 18, which web 22 is to be processed, for example a web 22 of material to be imprinted. For example, each of the cylinders 01, 18 has a circumference substantially corresponding to a length of a printed page, for example a newspaper page. The length L01 of the cylinder barrels substantially corresponds to four times the width of four side-by-side arranged printed pages, for example newspaper width. In this case, the cylinders 01 and/or 18 each have a groove 09 and/or 19, respectively, in the linear or axial direction. However, the dimensions of the cylinders 01, 18 can also be such that it is possible to substantially arrange two linear pages in the circumferential direction, and six, or even eight page widths of a printed page, for example a newspaper page, in the linear or axial direction. In this case, two grooves 09 and/or 19, for example, can be arranged on the circumference of the cylinders 01 and/or 18 respectively. This configuration is not specifically shown in FIG. 5.

As represented in FIG. 5a, the fittings and the corresponding method of operation for one of the transfer cylinders 18 are already conceivable for effectively reducing the vibration in the area of the printing location. It is achieved that the cylinder excitations or vibrations, at least in the immediate vicinity of the web 22 to be imprinted, are reduced. The phase of the obstructions 09, 19 is arranged in such a way that adjacent obstructions 09, 19 respectively roll off on each other.

An advantageous variation is shown in dashed lines in FIG. 5a), wherein a forme cylinder 01 and a transfer cylinder 18 are operated by an appropriate method of operation. The embodiment with the actuator 10, 11 is preferably arranged on non-moved cylinders 01, 18.

If such obstructions 19 exist only on the forme cylinders 18, or if it is intended only to mainly reduce vibrations at a nip point or a point of contact between the forme cylinder 01 and the transfer cylinder 18, it can be of advantage to only embody the two forme cylinders 18 with the described device, and to operate them by means of the mentioned method of operation, as depicted in FIG. 5b. In this case, it is possible to increase the counterforce at the forme cylinder 01, if required, in order to achieve parallel vibrations of the two cylinders 01, 18 acting together.

The arrangement of cylinders 01, 18, which need not be moved for engagement or disengagement, is advantageous. However, it is also possible to equip only the two transfer cylinders 18, or all cylinders 01, 18, for example, with the device in accordance with the present invention.

The solutions represented by a rubber-against-rubber printing unit are, of course, also applicable to printing units having a satellite cylinder, such as nine-cylinder or ten-cylinder printing unit.

The method of operation in accordance with the present invention can also be applied to other processing machinery, wherein materials are intended to be accurately transported and/or processed by rotating components. The method of operation and the device are particularly advantageous if the rotating component 01 has an obstruction 09, 19 on its surface, has a balance error based on its manufacture, or asymmetries, and/or works together with a second rotating body 18 having the above-described properties.

The method of operation is as follows for the entire method:

First, a course, amplitude or magnitude of the undesirable vibration is determined for a defined configuration and/or for a method of operation as a function of the angle of rotation position $\Phi$. This can be provided by the use of an additional, not specifically represented sensor. In an advantageous embodiment, the actuator 10, 11 is simultaneously used as a sensor, such as is possible, for example, in the case of a piezo element acting as the actuator 10, 11.

Afterwards, the course of a suitable counterforce, or of an actuating path, which is a function of the angle of rotation position $\Phi$, is determined by theoretical derivation, with the aid of this function, in such a way that the excitation itself and/or the vibration is effectively suppressed. In connection with this mode of operation, the course of the vibrations themselves and/or the course of the determined counterforce, or the actuating path, are stored in the memory unit 12. In this way, the course for the charging is predicted, and is independent, to a large extent, of measured values characterizing the vibration. Instead in the end, this valve only depends on the angle of rotation position $\Phi$.

The determined course or strength can now be used for other modes of operation or configurations, provided the tolerances in the finished product, or the machine load, etc.

permit this. During this comparative stationary or steady state operating situation, the rotating component is charged, in periodic repetitions, with the obtained and predicted signals, in accordance with the course of the determined counterforce or of the actuating path.

Otherwise, the described action is performed in connection with different operating modes or configurations which are relevant to the actual use, and to the respective dependency S (Φ), together with the values characteristic of the operating mode/configuration, is stored. These dependencies S (Φ) can each be called up for the desired production and can be employed in the described manner for reducing the vibrations.

Thus, no continuous determination of actual values for characterizing the vibration are absolutely necessary for this method of operation. The method of operation acts rapidly and effectively, since the steps to be taken have already been predicted prior to the occurrence of the event, such as obstruction or vibration.

However, in an embodiment which differs from the previously mentioned embodiment, the required amplitude and/or the phase, or the time for applying the signal S for the force or the force pulse or the chronological sequence to be charged, can take place as a function of a measured value which differs from the angle of rotation position Φ, for example, as an actual measurement of the path or the force at the cylinder 01 or at its journal 04, 08. A mixed form of the methods can also be advantageous. A base pattern and a base force on the basis of predicted data which are, for example, a function of the angle of position, are predicted, but a matching of strength and time is performed on the basis of other determined measured values. A system which is based on predicted signals S, or sequences, can also additionally be embodied to be self-learning and/or adaptive. In this case, the system employs, on the one hand, the dependable and quick method of "control", namely initially a measuring of the error, and only then a reaction occurring, while improvements of the algorithm, or the predicted signal S or sequences and/or strengths can yet be added. To this end, the vibration, for example, is determined continuously or in defined cycles by a measurement, and the stored parameters of the signals S are changed or complemented.

In an advantageous, because it is simple, embodiment, only an exterior excitation, i.e. a signal S or a force pulse which is, for example, pulse, ramp, triangle or delta-shaped, is impressed on the cylinder 01, 18, or on the journals 07, 08 per revolution of each of the grooves arranged in the circumferential direction on the cylinder 01, 18. The vibration excited by this single force pulse, per groove and per revolution, forms a negative interference with respect to the vibration that is excited by the groove 09, 19 or an obstruction 09/19, if the relative angular position Φ between the groove excitation and the exterior force pulse has been suitably selected and the amplitude corresponds.

Since a path load is applied to the cylinders 01, 18 because of the rubber blankets being compressed, so that the cylinders 01, 18 bend, forces are introduced, in an advantageous manner, by additional bearings 16, 17, specifically by the support bearings 16, 17, which are seated outside of the bearings 04, 06, which additional bearing 16, 17 initiate counter-bending and, in this way, reduce the total bending. Since the path load briefly ceases, or is at least reduced at the moment of the groove roll-over, the force applied by the outside-located bearings 16 on the journals 07, 08 should also cease or should be withdrawn during this time window, since otherwise an excess vibration of the cylinder 01, 18 would result. By the controlled application of the bending forces to the journals 07, 08 during the groove roll-over, it is possible to partially compensate for the course of the vibration, the groove beat i.e. the cessation of the bending moment exerted by the rubber blankets. In an advantageous embodiment of the present invention, the force control must take place within a time window which approximately corresponds to the length of time of the groove roll-over. An alternative to this would be, as already mentioned in connection with FIG. 2 b), the application of "counter vibrations" to the vibrations of the cylinder 01, 18, thereby fighting the symptoms. However, in this variation, it is an advantage for the actuating system that the force control need not take place in such a highly dynamic manner, since the relevant time window is then determined by the vibration frequency of the cylinder 01, 18, and not by the short time of the roll-over.

An embodiment of the present invention is advantageous, in particular in connection with cylinders 01, 18, whose ratio between the cylinder length L01 and the cylinder diameter D01 lies between 6 and 12, and in particular lies between 7 and 11, and in which a distance "a" in the axial direction of the journal 07, 08 from the center of the bearing 04, 06 to the center of the bearing 16, 17 is approximately 100 to 230 mm. For diameters, at least in the area of the application point of the bearings 16, 17, of the journal 07, 08 of 55 to 65 mm, the distance "a" preferably lies at 125 to 175 mm, while for diameters of 65 to 75 mm it lies, for example, between 150 and 230 mm. During the pulse, the journal 07, 08 is charged with a maximum force of, for example, 5 to 15 kN, and in particular a force of 7.5 to 11 kN. A movement of the support bearing 16, 17 advantageously lies between 25 and 100 µm, for journal diameters between 55 and 65 mm, more specifically between 45 and 100 µm, and in particular at approximately 60 µm, and for diameters between 65 and 75 mm for example at 25 to 80 µm.

The introduction of this force can now take place by two different variations: the force can be continuously applied during the length of rotation without an obstruction: i.e. with no roll-over, and a counter-bending can be created in this way. This can take place via the actuator itself in a "positive" direction, or by the application of an appropriate mechanical pre-stress. This force is then briefly withdrawn or switched off during the time window of the roll-over which, in the first case can be achieved by a withdrawal at the actuator itself, and in the second case by a counter-action of the actuator against the pre-stress. Static bending is also reduced by this.

At a rotational speed of 20,000 rph or revolutions per hour, the time window for charging or withdrawing lies, for example, between 1.5 and 5.0 ms, and in particular lies between 2.5 and 4.0 ms. At 90,000 rph, the time window lies between 0.3 and 1.0 ms, and in particular lies between 0.6 to 0.8 ms. These time windows are related to widths of 1 to 3 mm, in the circumferential direction, of the groove opening on the surface. For double wide openings, the time windows are greater by a factor of two, for openings four times as wide the time window are greater approximately by a factor of four.

In an advantageous embodiment of the present invention, the actuator 10, 11, including the control or memory device 12 and the power supply, is embodied in such a way that a force of, for example, 7.5 to 11 kN can be applied to a path length of, for example, 25 to 100 µm. A piezo-electric system is preferred here, wherein the actuator 10, 11 is embodied, as mentioned above, as a piezo element 10, 11.

While preferred embodiments of a method and device for reducing vibrations in rotating components, in accordance with the present invention, have been in forth fully any completely herein above, it will be apparent to one of skill in the art that various changes in, for example the type of web being printed, the drives for the cylinders, and the like could be made without departing form the true spirit and scope of the present inventor which is accordingly to be limited only by the appended claims.

The invention claimed is:

1. A method for reducing bending vibrations in at least one rotary cylinder of a processing machine including:
providing at least one journal for said at least one rotating cylinder;
supporting said at least one journal in a bearing;
providing an actuator for exerting a bending stress for counteracting said bending vibration in said at least one rotating cylinder;
engaging said journal with said actuator;
determining an angle of rotation position of said at least one rotating cylinder;
predicting a sequence of signals as a function of said angle of rotation position of said cylinder; and
charging said actuator with said sequence of signals in a periodically repeating pattern.

2. The method of claim 1 further including providing said signal with a strength and a direction of a counterforce being applied by said actuator.

3. The method of claim 2 further including providing said counterforce as at least one discrete pulse.

4. The method of claim 2 further including providing said counterforce as a function extending continuously within a period.

5. The method of claim 2 further including relieving an existing pre-stress using said signal.

6. The method of claim 2 further including correlating said counterforce directly with said angle of rotation position.

7. The method of claim 1 further including providing said signal with a size and direction of a required actuating path.

8. The method of claim 7 further including correlating said counterforce directly with said angle of rotation position.

9. The method of claim 1 further including charging said actuator with said sequence of signals in said periodic repetitions during steady state operating of said at least one rotating cylinder.

10. The method of claim 9 further including determining a course of said bending vibration as a function of said angle of rotation position, determining a course of said counterforce as a function of said angle of rotation position, and storing said course of said bending vibration and said course of said counterforce in a control and memory device.

11. The method of claim 10 further including providing a sensor and using said sensor for determining a course of said bending vibration.

12. The method of claim 11 further including providing said actuator as said sensor.

13. The method of claim 1 further including using said actuator for changing a position of an axial bending line of said journal.

14. The method of claim 1 further including providing a lever end of said at least one journal on a side of said bearing facing away from said rotating cylinder, and using said bearing as a pivot point for a bending stress applied to said lever end by said at least one actuator.

15. The method of claim 14 further including engaging said actuator with said journal at a distance of between 100 mm and 230 mm from a center of said bearing.

16. The method of claim 15 further including providing said journal having a diameter of between 55 mm and 65 mm and engaging said actuator with said journal at a distance of between 125 mm and 175 mm.

17. The method of claim 15 further including providing said journal having a diameter of between 65 mm and 75 mm and engaging said actuator with said journal at a distance of between 150 mm and 230 mm.

18. The method of claim 1 further including using said actuator and changing a position of said journal in a plane perpendicular to an axis of rotation of said rotating cylinder.

19. The method of claim 1 further including
providing journals at first and second spaced ends of said at least one rotating cylinder and
predicting a course of said signals as a function of said angle of rotation position of said cylinder.

20. The method of claim 1 further including providing said actuator with a component acting in a radial direction of said journal.

21. The method of claim 1 further including providing an outboard bearing on said journal and engaging said actuator with said outboard bearing.

22. The method of claim 1 further including engaging said actuator with said journal on a side of said bearing facing away from said rotating cylinder.

23. The method of claim 1 further including setting a length of said period corresponding to a whole number of revolutions of said at least one rotating cylinder.

24. The method of claim 1 further including providing a sensor and using said sensor for determining a course of said bending vibration.

25. The method of claim 24 further including providing said actuator as said sensor.

26. The method of claim 1 further including providing said actuator as a piezo element.

27. The method of claim 1 further including
providing at least one bending vibration inducing obstruction on a circumference of said rotating cylinder,
charging said actuator with said sequence of signals for producing a changeable force counteracting said bending vibration and
applying said changeable force at least once during each revolution of said rotating cylinder for each said obstruction.

28. The method of claim 27 further including providing a second cylinder and counteracting bending vibrations in said rotating cylinder caused by a rolling-off of said at least one obstruction on said second cylinder.

29. The method of claim 28 further including providing one changeable force for each said obstruction.

30. The method of claim 27 further including providing a second cylinder in contact with said rotating cylinder and relating said changeable force to an excitation caused by a rolling-off of said at least one obstruction on said second cylinder.

31. The method of claim 27 further including providing a bearing supporting said at least one journal and applying said changeable force on said at least one journal on a side of said bearing facing away from said rotating cylinder.

32. The method of claim 27 further including providing said rotating cylinder as a cylinder of a printing press.

33. The method of claim 1 further including providing said rotating cylinder as a cylinder of a processing machine for web-stamped materials.

* * * * *